United States Patent [19]

Tolley

[11] 4,158,041
[45] Jun. 12, 1979

[54] SEPARATION OF ILMENITE AND RUTILE

[75] Inventor: William K. Tolley, Arlington Heights, Ill.

[73] Assignee: UOP Inc., Des Plaines, Ill.

[21] Appl. No.: 879,419

[22] Filed: Feb. 21, 1978

[51] Int. Cl.$^2$ ............................................. C01G 23/04
[52] U.S. Cl. ...................................... 423/80; 423/86; 423/152; 209/166
[58] Field of Search ..................... 423/80, 83, 86, 150, 423/152; 75/1 T; 209/39, 166

[56] References Cited

U.S. PATENT DOCUMENTS

| | | | |
|---|---|---|---|
| 1,696,188 | 12/1928 | Campbell | 423/80 |
| 1,760,992 | 6/1930 | Palmer | 423/80 |
| 2,257,808 | 10/1941 | Phelps | 209/166 |
| 2,954,278 | 9/1960 | Gaskin et al. | 423/80 |
| 3,112,178 | 11/1963 | Judd | 423/83 |

OTHER PUBLICATIONS

Taggart, A., *Elements of Ore Dressing*, John Wiley & Sons, Inc., N.Y. (1951), pp. 234, 258, 259, 267, 268.

*Primary Examiner*—Brian Hearn
*Attorney, Agent, or Firm*—James R. Hoatson, Jr.; Raymond H. Nelson; William H. Page, II

[57] ABSTRACT

This invention relates to a process for separating rutile and ilmenite from ilmenite leach tails and is effected by treating the leach tails from an acidic leach to a flotation step whereby gangue is separated from the unreacted ilmenite and rutile. The latter is then roasted at an elevated temperature in a hydrous atmosphere to convert the ilmenite to a magnetic material. Thereafter the ilmenite may then be subjected to a magnetic separation whereby non-magnetic rutile may be recovered while the magnetic portion is recycled for further separation.

3 Claims, No Drawings

4,158,041

SEPARATION OF ILMENITE AND RUTILE

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures from solutions containing soluble titanium species usually results in also obtaining relatively large amounts of iron impurity with the titanium dioxide product.

Heretofore in the prior art various methods have been utilized to recover titanium values from titanium bearing sources. For example, in U.S. Pat. No. 3,236,596 an unroasted ilmenite ore is leached with hydrogen chloride at an elevated temperature. Following this, dissolved iron is reduced with iron or other reductants to precipitate ferrous chloride by saturating the liquor with hydrogen chloride gas. The hydrogen chloride is then extracted from the liquor by a vacuum distillation and the titanium is recovered by conventional means. Likewise, U.S. Pat. No. 3,825,419 reduces an ilmenite ore to produce ferrous oxides. The reduced ore is then leached for about 4 hours under a moderate pressure thereby dissolving the iron in the acid along with about 15% of the titanium. The iron is recovered as ferric oxide containing impurities in the spray roaster while the insoluble product which is primarily titanium dioxide but which contains all of the silica present in the original ore is recovered. U.S. Pat. No. 3,859,077 also discloses a process for recovering titanium in which a titanium tetrahalide is mixed with iron oxide in slag or a titaniferous ore at an extremely high temperature of about 1000° C. to produce volatile impurity chlorides and titanium dioxide. A similar patent, U.S. Pat. No. 3,929,962 also reduces a titanium bearing ore at a high temperature to produce titanium sesquioxide which is in a form whereby it is easier to treat for a titanium-iron separation. Another prior art reference, U.S. Pat. No. 3,903,239 teaches a method for recovering titanium in which unroasted ilmenite is leached over a period of days at room temperature to recover about 80% of the titanium. Sulfur dioxide is added after the leaching to cause a precipitation of the ferrous chloride after which titanium dioxide is recovered by diluting and heating the solution. While the magnetic susceptibility of ilmenite has been known to change by subjecting the ilmenite to a high temperature roast, I have now discovered that by utilizing the process hereinafter set forth in greater detail it will be possible to insure complete conversion of the ilmenite to a magnetic material which then may be separated from non-magnetic rutile and recycled for further treatment. By utilizing the method of the present invention it will be possible to obtain a conversion of the raw ore to the desired titanium metal values thereby permitting the production of said titanium metal values in an economically feasible manner.

This invention relates to a process for separating rutile from ilmenite. More specifically, the invention is concerned with the process for recovering greater yields of titanium from a titanium bearing source such as ilmenite thus insuring the obtention of said titanium in an economically feasible manner. By utilizing the improvement herein described in a process for obtaining titanium from a titanium bearing source, it is possible to obtain greater yields of the desired product with a separation of magnetic material from non-magnetic material whereby the former may be recycled for further separation steps.

It is therefore an object of this invention to provide an improved process for the production of titanium metal values.

A further object of this invention is to provide an improvement in a process for separating a titanium metal value such as rutile from a titanium bearing source such as ilmenite in a more economical and commercially feasible manner.

In one aspect an embodiment of this invention resides in a process for the separation of rutile and ilmenite from ilmenite leach tails which comprises subjecting said leach tails to a flotation treatment to separate gangue from said leach tails, subjecting the separated leach tails to a roast at an elevated temperature in a hydrous atmosphere whereby said ilmenite is rendered magnetic in nature, and separating the non-magnetic rutile from the magnetic ilmenite.

A specific embodiment of this invention is found in a process for the separation of rutile and ilmenite from ilmenite leach tails which comprises subjecting said leach tails to a flotation treatment to separate gangue from said leach tails, thereafter subjecting the separated leach tails to a roast at a temperature in the range of from about 700° to about 1000° C. in a hydrous atmosphere which is afforded by the presence of steam whereby said ilmenite is rendered magnetic in nature and thereafter separating the non-magnetic rutile from the magnetic ilmenite.

Other objects and embodiments will be found in the following detailed description of the present invention.

As hereinbefore set forth, the present invention is concerned with a process for separating ilmenite and rutile from ilmenite leach tails. By utilizing the process as hereinafter set forth in greater detail, it will be possible to effect a more complete separation of ilmenite from rutile and ultimately obtain a higher yield of the desired titanium metal values. The method for obtaining the desired titanium metal value is effected by subjecting a titanium bearing source which also contains other metals including iron, vanadium, chromium, manganese, etc., such as an ilmenite ore, to a reductive roast at an elevated temperature in the range of from about 650° to about 1000° C. or more, said reductive roast being effected in the presence of a reductant such as hydrogen, carbon monoxide, combination of carbon monoxide and hydrogen, etc., or any other suitable reductant. In the preferred embodiment the reductive roast is effected on a metal bearing source such as an ore which has been crushed to a particle size less than about 100 mesh for a period of time which may range from about 0.5 up to about 2 hours or more. One particular reducing atmosphere which may be used to accomplish the purpose of the roast comprises a mixture of about 50% carbon monoxide and 50% hydrogen with an excess of the reductant being utilized in order to completely reduce the iron which is present in the system to the metal. Following the reductive roast of the metal bearing source, the source is then subjected to an aqueous hydrogen chloride leach which is also effected at elevated temperatures usually in the range of from about 85° to about 105° C. for a period of time ranging from about 0.25 up to about 1 hour or more in duration. The aqueous hydrogen chloride solution which may also be characterized as hydrochloric acid will contain from about 20% up to about 37% hydrogen chloride. Upon completion of the leach step the solubilized titanium metal values will be separated from the solid tails which will comprise unreacted ilmenite, some rutile and gangue which comprises silica, mica, quartz, etc.

The solid tails which remain are suspended in a water slurry and an appropriate flotation collector reagent is added such as tall oil, oleic acid, etc. The pH of the slurry is adjusted to a range of from about 6 to about 8. The adjustment of the pH is accomplished by the addition of an acid or base, the usual additive being a base such as lime. The slurry is agitated vigorously for approximately 5 minutes, at which time air bubbles are introduced into the slurry, resulting in the ilmenite and rutile floating on or near the surface of the slurry while the gangue which, as hereinbefore set forth, comprises silica, mica, quartz, etc., will sink and collect at the bottom of the vessel. Thereafter the suspended ilmenite and rutile may be filtered or skimmed off with the froth and recovered.

Following recovery of the mixture of ilmenite and rutile, the solids are then subjected to a roast. The roast is effected at an elevated temperature in the range of from about 700° to about 1000° C. and preferably at a range of from about 750° to about 900° C. To insure a conversion of the ilmenite to a magnetic material during the roasting, the aforesaid roast is effected in a hydrous atmosphere, said hydrous conditions being necessary to convert the ilmenite to a magnetic material rather than remaining non-magnetic in nature. The hydrous atmosphere during the roast is effected by the presence of water which may be in the form of steam or vapor. The ilmenite and rutile are roasted in this hydrous atmosphere for a period of time which may range from about 0.5 up to about 2 hours or more in duration, the amount of time required being that which is sufficient to convert all of the ilmenite to a magnetic material.

Upon completion of the desired roasting period the magnetic ilmenite may be separated from the non-magnetic rutile by any conventional means such as applying a magnetic force to the mixture whereby the ilmenite is attracted to said magnetic force while the non-magnetic rutile remains in position. Thereafter the ilmenite which has been separated from the rutile may be recovered and recycled to form a portion of the feedstock which is subjected to the aforesaid steps of reductive roasting and leaching, while the rutile may be recovered and processed in any conventional manner to obtain the desired titanium values.

While the aforesaid description of the process is indicative of a batch type operation, it is also contemplated within the scope of this invention that it is possible to effect the process using a continuous method of operation in which the charge stock comprising crushed ore is continuously fed to a reducing roast zone wherein the charge is subjected to a reductive roast utilizing a reductant of the type hereinbefore set forth which is also continuously charged to this zone. After passage through the zone for a predetermined period of time the reduced charge stock is continuously withdrawn and passed to a leaching zone wherein it is subjected to leach treatment with a hydrogen chloride source such as hydrochloric acid. The leaching zone is maintained at an elevated temperature and after passage through this zone the leach liquor and tails are continuously withdrawn and passed to a separation zone wherein the leach liquor containing dissolved metal chlorides is continuously withdrawn after separation from the leach tails. The leach tails comprising undissolved or unreacted ilmenite, rutile and gangue is continuously charged to a flotation zone wherein a flotation slurry is effected at a pH in the range of from about 6 to about 8, said pH being maintained by the introduction of an acid or base in an amount necessary to afford the desired range. the ilmenite and rutile are continuously withdrawn from this zone by decantation, filtration or other means known in the art and passed to a roast zone wherein the solids are subjected to a roast at a temperature in the range of from about 700° to about 1000° C. in a hydrous atmosphere, said atmosphere being afforded by the continuous introduction of water in the form of vapor or steam to the roast zone. After passage through the roast zone the solids are passed to a separation zone wherein they are subjected to the action of a magnetic force, the magnetic nature of ilmenite material causing a separation from the non-magnetic rutile. After separation of the non-magnetic rutile from the magnetized ilmenite has been effected, the latter may be recovered by any conventional means and recycled to the reductive roast zone to form a portion of the feedstock while the rutile is collected and subjected to any conventional means of treatment whereby the desired titanium values may be recovered. It is to be understood that the leached liquor which contained the dissolved metal chlorides after having been separated from leached tails may be treated to precipitate titanium dioxide which is thereafter recovered and passed to storage.

The following examples are given for purposes of illustrating the process of this invention. However, it is to be understood that said examples are given merely for purposes of illustration and that the present process is not necessarily limited thereto.

EXAMPLE I

A sample of domestic ilmenite may be crushed to −100 mesh and thereafter heated to a temperature of 750° C. under nitrogen in a rotating quartz furnace tube. Following this hydrogen and carbon monoxide gas may be passed through the tube at a rate of 640 cc/min. for a period of 1 hour while maintaining the temperature of the tube at about 750° C. At the end of the 1 hour period the tube and sample contained therein may be cooled under nitrogen to room temperature and the reduced ilmenite ore may be mixed with concentrated hydrochloric acid and heated to a temperature of 100° C. The solid ilmenite ore may be leached for a period of 0.25 hours under reflux and filtered.

The leached solids were then roasted for a period of 1 hour at a temperature of 900° C. in a fluid-bed reactor using steam as the fluidizing gas. After cooling, it was found that the ilmenite in the sample was magnetic in nature and was completely attracted to a magnet.

In contradistinction to this, when a second sample of the ore was roasted for a period of 1 hour at a temperature of 900° C. using dry air as a fluidizing gas, the sample after cooling exhibited no reactivity to the magnet.

EXAMPLE II

In this example a sample of ilmenite ore from Norway was treated in a manner similar to that set forth in Example I above and roasted in a fluid-bed reactor for a period of 2 hours at a temperature of 900° C. using steam as the fluidizing gas. At the end of the 2 hour period the sample was cooled and the ilmenite was found to be completely attracted to a magnet.

A second sample of the ilmenite ore from Norway when roasted at 750° C. in a fluid-bed reactor using steam as the fluidizing gas also exhibited a high reactivity to a magnet upon cooling.

Conversely, if the samples of Norwegian ilmenite ore are treated in an oxidizing atmosphere which is anhydrous in nature, the ore, after treatment, will not exhibit any magnetic activity.

It is, therefore, readily apparent from the above examples that a more efficient separation of magnetic ilmenite from non-magnetic rutile may be accomplished when the roasting of the ore is effected in a hydrous atmosphere, the ilmenite being uneffected by magnetism when the same roast is effected in a dry or anhydrous atmosphere.

I claim as my invention:

1. In a method for the separation of rutile and ilmenite from a titanium bearing source containing titanium metal values which method comprises subjecting said source to a reductive roast at a temperature in the range of from about 650° to about 1000° C., treating said roasted source with an aqueous hydrogen chloride leach solution at a pH of from about 6 to about 8 and at an elevated temperature of from about 85° to about 105° C. to solubilize titanium metal values, separating said solubilized titanium metal values from the solid leach tails comprising ilmenite, rutile, and a gangue comprising silica, mica, and quartz, separating said ilmenite and rutile of said solid leach tails by charging said solid tails to a flotation collector containing a water slurry wherein said gangue sinks to the bottom of said water slurry flotation collector, and recovering said ilmenite and rutile from the surface of said collector, the improvement which comprises effecting a roast of said recovered ilmenite and rutile recovered from said collector in a hydrous atmosphere to convert the metallic iron of said ilmenite to a magnetic state and separating said magnetic ilmenite from the non-magnetic rutile.

2. The process as set forth in claim 1 in which said hydrous atmosphere is afforded by the presence of steam.

3. The process as set forth in claim 1 in which said hydrous atmosphere is afforded by the presence of water vapor.